(12) United States Patent
Brüning et al.

(10) Patent No.: US 6,559,229 B1
(45) Date of Patent: May 6, 2003

(54) BLENDS COMPRISING THERMOPLASTIC POLYURETHANE

(75) Inventors: Ines Brüning, Diepholz (DE); Andreas Chlosta, Lemförde (DE); Günter Scholz, Lemförde (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/955,758

(22) Filed: Sep. 19, 2001

Related U.S. Application Data

(62) Division of application No. 09/310,286, filed on May 12, 1999, now Pat. No. 6,319,985.

(30) Foreign Application Priority Data

May 19, 1998 (DE) .......................... 198 22 387

(51) Int. Cl.⁷ .................... C08K 3/36; C08K 7/14; C08L 51/06; C08L 75/04
(52) U.S. Cl. ................. 525/66; 525/125; 525/131
(58) Field of Search ................... 525/66, 131, 125

(56) References Cited

U.S. PATENT DOCUMENTS

| | | | | |
|---|---|---|---|---|
| 4,317,890 A | | 3/1982 | Goyert et al. | 525/66 |
| 4,373,063 A | | 2/1983 | Sakano et al. | 525/64 |
| 4,423,185 A | * | 12/1983 | Matsumoto et al. | 525/66 |
| 4,500,671 A | | 2/1985 | Goyert et al. | 524/494 |
| 4,883,837 A | * | 11/1989 | Zabrocki | 525/66 |
| 4,990,557 A | * | 2/1991 | Lee | 524/494 |
| 5,149,739 A | * | 9/1992 | Lee | 525/66 |
| 5,274,023 A | | 12/1993 | Takahashi et al. | 524/425 |
| 5,696,205 A | | 12/1997 | Müller | 525/77 |

FOREIGN PATENT DOCUMENTS

| | | | |
|---|---|---|---|
| EP | 0 353 673 A1 | | 2/1990 |
| EP | 0 354 431 A1 | | 2/1990 |
| EP | 195 13 501 A1 | | 10/1996 |
| JP | 91-090706/13 | | 7/1989 |
| JP | 91-090708/13 | | 10/1989 |
| JP | 94-206681-25 | | 10/1992 |
| JP | 97-532914/49 | | 3/1995 |
| JP | 9-30628 | * | 2/1997 |

OTHER PUBLICATIONS

US 5,109,050, 4/1992, Takahashi et al. (withdrawn)
Japanese Abstract—JP 6145500—P.62—Urethane Thermoplastic Elastomer Alloys and Their Manufacture.

* cited by examiner

*Primary Examiner*—Ana Woodward
(74) *Attorney, Agent, or Firm*—Fernando A. Borrego

(57) ABSTRACT

The blends comprise
(a) thermoplastic polyurethane having a Shore hardness of from 60 A to 50 D and
(b) ethylene-propylene (EPM) rubbers and/or modified ethylene-propylene (EPM) rubbers, where the weight ratio of (a):(b) is from 3:1 to 999:1.

5 Claims, No Drawings

BLENDS COMPRISING THERMOPLASTIC POLYURETHANE

This is a division of application Ser. No. 09/310,286, filed May 12, 1999, now U.S. Pat. No. 6,319,985.

The present invention relates to blends comprising (a) thermoplastic polyurethane having a Shore hardness of from 60 A to 50 D and (b) ethylene-propylene (EPM) rubbers and/or modified ethylene-propylene (EPM) rubbers, where the weight ratio of (a): (b) is from 3:1 to 999:1, preferably from 6:1 to 100:1.

Thermoplastic polyurethanes, hereinafter also referred to as TPUS, are generally known. As materials, they are notable for high strength together with a good elasticity. In addition to these excellent properties, a high abrasion resistance is desirable for many applications. To reduce abrasion, blends of TPUs with rubbers based on ethylene-propylene polymers are described in the literature. Thus, JP-A 09 255 868 discloses general blends comprising TPU and ethylene-propylene rubbers which have been modified with aromatic, unsaturated compounds and with unsaturated substances containing polar, functional groups. In addition, a further modification is achieved by mixing the ethylene-propylene rubbers mentioned with styrene and 2-hydroxyethyl methacrylate and various additives. The weight ratio of TPU to modified rubber is 2.3:1 in the example. A disadvantage of these blends is the addition of unsaturated aromatic compounds which are undesirable in some applications. Furthermore, as a result of the high proportion of rubber these blends display, as expected, no reduction in the abrasion compared to pure TPUs. This result is consistent with findings in the case of TPU mixed with other plastics. As a rule, the arrangement of the soft segments and the hard segments, which in the TPUs leads to the excellent properties of these materials, is destroyed by mixing in further plastics. Mixing other plastics with TPU thus generally leads to a worsening of the properties compared to the pure TPU. Further TPU-rubber blends are described in JP-A 06 145 500, U.S. Pat. No. 5,149,739, J0 3035-054 and J0 3035-056.

It is an object of the present invention to develop TPU-based blends which display significantly reduced abrasion compared to pure TPUs without having disadvantages in the other properties, for example in respect of the tensile strength.

We have found that this object is achieved by the blends described at the outset.

The Shore hardnesses reported in the present application are measured in accordance with DIN 53 505.

As TPU (a) in the blends of the present invention, it is possible to use generally customary TPUs which have the hardness specified according to the present invention and can be prepared by known methods from (c) isocyanates, (d) compounds which are reactive toward isocyanates and, if desired (e) chain extenders in the presence or absence of (f) catalysts and/or (g) auxiliaries and/or additives, where the ratio of the isocyanate groups of the component (c) to the sum of isocyanate-reactive groups of the components (d) and, if used, (e) is usually from 1:0.9 to 1:1.1.

Examples of starting components and preparative methods for (a) and (b) are described below.

c) Suitable organic isocyanates (c) are preferably aliphatic, cycloaliphatic and in particular aromatic diisocyanates. Specific examples are: aliphatic diisocyanates such as hexamethylene 1,6-diisocyanate, 2-methylpentamethylene 1,5-diisocyanate, 2-ethylbutylene 1,4-diisocyanate or mixtures of at least 2 of the $C_6$-alkylene diisocyanates mentioned, pentamethylene 1,5-diisocyanate and butylene 1,4-diisocyanate, cycloaliphatic diisocyanates such as 1-isocyanato-3,3,5-trimethyl-5-isocyanatomethylcyclohexane (isophorone diisocyanate), 1,4- and/or 1,3-bis(isocyanatomethyl) cyclohexane (HXDI), cyclohexane 1,4- diisocyanate, 1-methylcyclohexane 2,4- and 2,6-diisocyanate and also the corresponding isomer mixtures, dicyclohexylmethane 4,4'-, 2,4'- and 2,2'-diisocyanate and also the corresponding isomer mixtures and preferably aromatic diisocyanates such as tolylene 2,4-diisocyanate, mixtures of tolylene 2,4- and 2,6-diisocyanate, 3,3'-dimethylbiphenyl 4,4'-diisocyanate (TODI), p-phenylene diisocyanate (PDI), m-, p-xylylene diisocyanate (XDI), diphenylmethane 4,4'-, 2,4'- and 2,2'-diisocyanate (MDI), mixtures of diphenylmethane 2,4'- and 4,4'-diisocyanate, urethane-modified liquid diphenylmethane 4,4'- and/or 2,4'-diisocyanates, 1,2-bis(4-isocyanatophenyl)ethane (EDI) and naphthylene 1,5-diisocyanate. Preference is given to using naphthylene 1,5-diisocyanate, dicyclohexylmethane 4,4'-diisocyanate, hexamethylene 1,6-diisocyanate, diphenylmethane diisocyanate isomer mixtures having a diphenylmethane 4,4'-diisocyanate content of greater than 96% by weight and, in particular, diphenylmethane 4,4'-diisocyanate and hexamethylene 1,6-diisocyanate.

d) Suitable substances (d) which are reactive toward isocyanates are, for example, polyhydroxyl compounds having molecular weights of from 500 to 8000, preferably polyetherols and polyesterols. However, other suitable isocyanate-reactive substances (d) are hydroxyl-containing polymers, for example polyacetals such as polyoxymethylenes and especially water-insoluble formals, e.g. polybutanediol formal and polyhexanediol formal, and aliphatic polycarbonates, particularly those prepared from diphenyl carbonate and 1,6-hexanediol by transesterification and having the abovementioned molecular weights. The polyhydroxyl compounds mentioned can be used as individual components or in the form of mixtures.

The mixtures for preparing the TPU or TPUs are usually based at least predominantly on bifunctional isocyanate-reactive substances, i.e. the mean functionality of the component (d) is preferably from 1.8 to 2.6, particularly preferably from 1.9 to 2.2. The TPUs are thus predominantly unbranched, i.e. predominantly uncrosslinked.

Suitable polyetherols can be prepared by known methods, for example from one or more alkylene oxides having from 2 to 4 carbon atoms in the alkylene radical and, if appropriate, an initiator molecule containing two reactive hydrogen atoms in bound form by anionic polymerization using alkali metal hydroxides such as sodium or potassium hydroxide or alkali metal alkoxides such as sodium methoxide, sodium or potassium ethoxide or potassium isopropoxide as catalysts or by cationic polymerization using Lewis acids such as antimony pentachloride, boron fluoride etherate, etc., or bleaching earth as catalysts. Examples of alkylene oxides are: ethylene oxide, 1,2-propylene oxide, tetrahydrofuran, 1,2- and 2,3-butylene oxide. Preference is given to using ethylene oxide and mixtures of 1,2-propylene oxide and ethylene oxide. The alkylene oxides can be used individually, alternately in succession or as mixtures. Examples of suitable initiator molecules are: water, aminoalcohols such as N-alkyldialkanolamines, for example N-methyldiethanolamine, and diols, e.g. alkanediols or dialkylene glycols having from 2 to 12 carbon atoms, preferably from 2 to 6 carbon atoms, for example ethanediol, 1,3-propanediol, 1,4-butanediol and 1,6-hexanediol. If desired, it is also possible to use mixtures of initiator molecules. Further suitable polyetherols are the hydroxyl-containing polymerization products of tetrahydrofuran (polyoxytetramethylene glycols).

Preference is given to using polyetherols derived from 1,2-propylene oxide and ethylene oxide in which more than 50%, preferably from 60 to 80%, of the OH groups are primary hydroxyl groups and in which at least part of the ethylene oxide is arranged as a terminal block; particular preference is given to using polyoxytetramethylene glycols.

Such polyetherols can be obtained by, for example, first polymerizing the 1,2-propylene oxide onto the initiator molecule and subsequently polymerizing on the ethylene oxide or first copolymerizing all the 1,2-propylene oxide with part of the ethylene oxide and subsequently polymerizing on the remainder of the ethylene oxide or, stepwise, first polymerizing part of the ethylene oxide onto the initiator molecule, then polymerizing on all of the 1,2-propylene oxide and then polymerizing on the remainder of the ethylene oxide.

The polyetherols, which are essentially linear in the case of the TPUS, have molecular weights of from 500 to 8000, preferably from 600 to 6000 and in particular from 800 to 3500. They can be used either individually or in the form of mixtures with one another.

Suitable polyesterols can be prepared, for example, from dicarboxylic acids having from 2 to 12 carbon atoms, preferably from 4 to 8 carbon atoms, and polyhydric alcohols. Examples of suitable dicarboxylic acids are: aliphatic dicarboxylic acids such as succinic acid, glutaric acid, suberic acid, azelaic acid, sebacic acid and preferably adipic acid and aromatic dicarboxylic acids such as phthalic acid, isopthalic acid and terephthalic acid. The dicarboxylic acids can be used individually or as mixtures, e.g. in the form of a succinic, glutaric and adipic acid mixture. Likewise, mixtures of aromatic and aliphatic dicarboxylic acids can be used. To prepare the polyesterols, it may be advantageous to use the corresponding dicarboxylic acid derivatives such as dicarboxylic esters having from 1 to 4 carbon atoms in the alcohol radical, dicarboxylic anhydrides or dicarboxylic acid chlorides in place of the dicarboxylic acids. Examples of polyhydric alcohols are alkanediols having from 2 to 10, preferably from 2 to 6, carbon atoms, e.g. ethanediol, 1,3-propanediol, 1,4-butanediol, 1,5-pentanediol, 1,6-hexanediol, 1,10-decanediol, 2,2-dimethylpropane-1,3-diol and 1,2-propanediol and dialkylene ether glycols such as diethylene glycol and dipropylene glycol.

Depending on the desired properties, the polyhydric alcohols can be used alone or, if desired, as mixtures with one another.

Also suitable are esters of carbonic acid with the above-mentioned diols, in particular those having from 4 to 6 carbon atoms, e.g. 1,4-butanediol and/or 1,6-hexanediol, condensation products of ω-hydroxycarboxylic acids, for example ω-hydroxycaproic acid, and preferably polymerization products of lactones, for example substituted or unsubstituted ω-caprolactones.

Polyesterols which are preferably used are alkanediol polyadipates having from 2 to 6 carbon atoms in the alkylene radical, e.g. ethanediol polyadipates, 1,4-butanediol polyadipates, ethanediol-1,4-butanediol polyadipates, 1,6-hexanediol-neopentyl glycol polyadipates, polycaprolactones and, in particular, 1,6-hexanediol-1,4-butanediol polyadipates.

The polyesterols have molecular weights (weight average) of from 500 to 6000, preferably from 800 to 3500.

e) Suitable chain extenders (e), which usually have molecular weights of from 60 to 499, preferably from 60 to 300, are preferably alkanediols having from 2 to 12 carbon atoms, preferably 2,4 or 6 carbon atoms, e.g. ethanediol, 1,6-hexanediol and in particular 1,4-butanediol, and dialkylene ether glycols such as diethylene glycol and dipropylene glycol. However, other suitable chain extenders are diesters of terephthalic acid with alkanediols having from 2 to 4 carbon atoms, e.g. bis(ethanediol) terephthalate or bis(1,4-butanediol) terepthalate, hydroxyalkylene ethers of hydroquinone such as 1,4-di(β-hydroxyethyl)hydroquinone, (cyclo) aliphatic diamines such as 4,4'-diaminodicyclohexylmethane, 3,3'-dimethyl-4,4'-diaminodicyclohexylmethane, 1-amino-3,3,5-trimethyl-5-aminomethylcyclohexane, ethylenediamine, 1,2- and 1,3-propylenediamine, N-methylpropylene-1,3-diamine and N,N'-dimethylethylenediamine and aromatic diamines such as 2,4- and 2,6-toluenediamine, 3,5-diethyl-2,4- and -2,6-toluenediamine and primary, ortho-dialkyl-, -trialkyl- and/or -tetraalkyl-substituted 4,4'-diaminodiphenylmethanes.

Preferred chain extenders are alkanediols having from 2 to 6 carbon atoms in the alkylene radical, in particular 1,4-butanediol, and/or dialkylene glycols having from 4 to 8 carbon atoms.

To set the hardness specified according to the present invention for the TPUs and the melting points of the TPUs, the molar ratio of the formative components (d) and (e) is usually varied in a range from (d):(e)=1:0.8 to (d):(e)=1:10, preferably from (d):(e)=1:1 to (d):(e)=1:6.4, with the hardness and the melting point of the TPUs increasing with increasing diol content. Preference is given to TPUs based on:

(c) diphenylmethane 4,40-diisocyanate (MDI) and/or hexamethylene diisocyanate, (d) polyoxytetramethylene glycol, polyetherols based on 1,2-propylene oxide and ethylene oxide and/or polyesterols based on alkanediol polyadipate having from 2 to 6 carbon atoms in the alkylene radical, (e) 1,2-ethanediol, 1,4-butanediol and/or 1,6-hexanediol, where the ratio of the isocyanate groups of the component (c) to the sum of the isocyanate-reactive groups of the components (d) and (e) is preferably from 1:0.9 to 1:1.1 and (d) and (e) are used in a molar ratio of (d):(e) of from 1:1 to 1:6.4.

f) Suitable catalysts which, in particular, accelerate the reaction between the NCO groups of the diisocyanates (c) and the hydroxyl groups of the formative components (d) and (e) are the customary catalysts known from the prior art, namely tertiary amines such as triethylamine, dimethylcyclohexylamine, N-methylmorpholine, N,N'-dimethylpiperazine, 2-(dimethylaminoethoxy)ethanol, diazabicyclo-[2.2.2]-octane and the like and also, in particular, organic metal compounds such as titanic esters, iron compounds such as iron(III) acetylacetonate, tin compounds such as tin diacetate, tin dioctoate, tin dilaurate or the dialkyl tin salts of aliphatic carboxylic acids, e.g. dibutyltin diacetate and dibutyltin dilaurate, or the like. The catalysts are usually used in amounts of from 0.002 to 0.1 part per 100 parts of polyhydroxyl compound (d).

g) Apart from catalysts, customary auxiliaries and/or additives (g) can also be added to the formative components (c) to (e). Examples which may be mentioned are surface-active substances, flame retardants, nucleating agents, oxidation inhibitors, stabilizers, lubricants and mold release agents, dyes and pigments, inhibitors, stabilizers against hydrolysis, light, heat or discoloration, inorganic and/or organic fillers, reinforcing materials and plasticizers.

Further details regarding the abovementioned auxiliaries and additives may be found in the specialist literature.

The preparation of the TPUs from, for example, the starting components described is generally known and has been described many times. For example, the reaction mixture comprising (c), (d) and, if desired, (e), (f) and/or (g) can be reacted by the known one-shot process or by the prepolymer process, for example in a reaction extruder and/or on a customary belt unit. The TPUs prepared in this way can subsequently be pelletized or granulated and processed together with the component (b) to produce the, preferably homogeneous, blends of the present invention.

According to the present invention, the blends comprise, as component (b), ethylene-propylene (EPM) rubbers or modified ethylene-propylene rubbers. These rubbers based on ethylene and propylene, their preparation and their properties have been described many times and are generally known. Such rubbers are also commercially available.

The EPM or modified EPM rubbers preferably have a Mooney viscosity L(1+4) at 100° C. of >35 or an MFI (230° C., 10 kg) of >8.

The modified EPM rubbers can advantageously also be grafted with reactive carboxylic acids or their derivatives. Examples which may be mentioned are acrylic acid, methacrylic acid and their derivatives, e.g. glycidyl (meth)acrylate, and maleic anhydride.

Preferably (b) is used in unmodified form or grafted with acrylic acid, methacrylic acid, their derivatives and/or maleic anhydride in the blends of the present invention.

In addition to (a) and (b), the blends of the present invention can advantageously further comprise auxiliaries and/or additives, for example plasticizers, light stabilizers, lubricants, blowing agents, coupling agents, fillers, surface-active substances, flame retardants, dyes and pigments, stabilizers against hydrolysis, heat or discoloration and/or reinforcing materials. These auxiliaries and/or additives can be used either in the preparation of the TPUs, as described above, or be added to the component (a) and/or (b) in the production of the blend.

As light stabilizers, it is possible to use all customary light stabilizers, for example compounds based on benzophenone, benzotriazole, cinnamic acid, organic phosphates and phosphonites and also sterically hindered amines.

Possible lubricants are, for example, hydrocarbons such as oils, paraffins, PE waxes, PP waxes, fatty alcohols having from 6 to 20 carbon atoms, ketones, carboxylic acids such as fatty acids, montanic acid or oxidized PE wax, carboxamides and carboxylic esters, e.g. comprising ethanol, fatty alcohols, glycerol, ethanediol or pentaerythritol as alcohol and long-chain carboxylic acids as acid component.

Stabilizers which can be used are customary antioxidants, for example phenolic antioxidants such as alkylated monophenols and esters and/or amides of β-(3,5-di-tert-butyl-4-hydroxyphenyl)propionic acid and/or benzotriazoles. Examples of possible antioxidants are mentioned in EP-A 698637 and EP-A 669367. Specific examples of phenolic antioxidants are 2,6-di-tert-butyl-4-methylphenol, pentaerythrityl tetrakis[3-(3,5-di-tert-butyl-4-hydrqxyphenyl)propionate] and N,N'-di(3,5-di-tert-butyl-4-hydroxyphenylpropionyl)hexamethylene diamine. The stabilizers mentioned can be used individually or in mixtures.

When blending the components (a) and (b), the components are preferably present in a fluid, softened or molten state. The homogeneous mixing of the components is preferably carried out at temperatures which are above the melting points of (a) and (b). The temperature at which the components are mixed is usually from 160 to 250° C., preferably from 190 to 240° C., particularly preferably from 200 to 230° C. Mixing of the components to give a homogeneous product can be carried out continuously or batchwise, preferably with degassing, using customary equipment having facilities for heating and stirring, kneading or rolling. The mixing of the components (a) and (b) is preferably carried out in a customary extruder.

The blends of the present invention, which preferably have a Shore hardness of from 60 A to 54 D, can, for example, be pelletized or granulated, or be extruded to form cable sheathing, films, hoses, fibers, profiles or blow-molded articles, injection molded to produce shoe uppers, shoe soles, industrial moldings, consumer articles and shaped bodies of all types or calendered to form coatings and films by generally known methods.

Contrary to expectations on the basis of results obtained with other blends, a significant reduction in abrasion was found in the case of the blends of the present invention, without there being any adverse effect on the tensile strengths. This result is all the more puzzling because other blends with TPU have significant disadvantages in the properties owing to the disruption of the hard and soft segments. These advantages become particularly clear in comparison with pure TPU or blends comprising TPU which were prior art, for example blends having a comparatively high proportion of rubber as described in JP-A 09 255 868 or blends in which a relatively hard TPU is present. The advantages according to the present invention are restricted to TPU having the hardness range specified according to the present invention and additionally to the mixing ratios specified according to the present invention. These advantages could not have been deduced from the prior art and are illustrated in the following examples.

EXAMPLES

Various TPUs were homogenized with modified and unmodified EPM in a twin-screw extruder and a single-screw extruder at from 190 to 230° C. and processed to produce test specimens. The blends were also produced by reaction extrusion in an extruder customary for this purpose. Table 1 shows the various blends and their properties. The "content" column gives the content of modified or unmodified EPM in the blend, based on the total weight of the blend.

TPU 1: Elastollan ™ 1185 A, Elastogran GmbH,
TPU 2: Elastollan ™ LP 9188, Elastogran GmbH,
TPU 3: Elastollan ™ 1174 D, Elastogran GmbH,
TPU 4: Elastollan ™ 1180 A, Elastogran GmbH,
TPU 5: Elastollan ™ C 85 A, Elastogran GmbH,
TPU 6: Elastollan ™ S 90 A, Elastogran GmbH,
TPU 7: Elastollan ™ B 85 A, Elastogran GmbH.

TPUs based on both polyethers (TPU 1–4) and on polyesters (TPU 5–7) were examined.

EPM type 1: EPM, unmodified, Mooney viscosity (1+4) at 125° C. of 10,
MFI (230° C./10 kg) of 35, EPM type 2: EPM-g-MA (0.6% of MA), MFI (230° C./10 kg) of 9, EPM-type 3: EPM-g-MA (0.7% of MA), MFI (230° C./10 kg) of 22.

MFI: melt flow index measured in accordance with DIN ISO 1133.

TABLE 1

| Example | TPU | EPM type | Content % | Abrasion mm³ | Tensile strength N/mm² | Density g/cm³ | Shore hardness |
|---|---|---|---|---|---|---|---|
| 1 | 1 | — | — | 24 | 39 | 1.12 | 86 A/37 D |
| 2 | 1 | 1 | 10 | 9 | 39 | 1.09 | 83 A/35 D |
| 3 | 1 | 1 | 10 | 7 | 43 | 1.09 | 84 A/34 D |
| 4 | 1 | 1 | 20 | 23 | 28 | 1.06 | 81 A/33 D |
| 5 | 1 | 1 | 20 | 24 | 38 | 1.06 | 82 A/33 D |
| 6 | 1 | 2 | 10 | 5 | 38 | 1.09 | 84 A/36 D |
| 7 | 1 | 2 | 10 | 5 | 41 | 1.09 | 84 A/36 D |
| 8 | 1 | 2 | 20 | 13 | 34 | 1.065 | 84 A/35 D |
| 9 | 1 | 2 | 20 | 11 | 35 | 1.06 | 84 A/35 D |
| 10 | 1 | 3 | 10 | 7 | 39 | 1.085 | 83 A/35 D |
| 11 | 1 | 3 | 20 | 13 | 33 | 1.055 | 79 A/31 D |
| 12 | 2 | — | — | 49 | 34 | 1.135 | 85 A/38 D |
| 13 | 2 | 1 | 10 | 12 | 37 | 1.115 | 85 A |
| 14 | 2 | 1 | 20 | 42 | 33 | 1.08 | 83 A |
| 15 | 2 | 2 | 10 | 7 | 36 | 1.11 | 86 A |
| 16 | 2 | 2 | 20 | 12 | 33 | 1.08 | 85 A |
| 17 | 2 | 3 | 10 | 11 | 34 | 1.105 | 86 A |
| 18 | 2 | 3 | 20 | 36 | 34 | 1.075 | 83 A |
| 19 (c) | 3 | — | — | 28 | 47 | 1.195 | 75 D |
| 20 (c) | 3 | 1 | 10 | 35 | 49 | 1.15 | 64 D |
| 21 (c) | 3 | 2 | 10 | 30 | 49 | 1.155 | 66 D |
| 22 (c) | 3 | 3 | 10 | 28 | 47 | 1.15 | 64 D |
| 23 | 4 | — | — | 37 | 50 | 1.11 | 82 A |
| 24 | 4 | 3 | 10 | 6 | 35 | 1.075 | 78 A |
| 25 | 4 | 3 | 20 | 29 | 30 | 1.05 | 74 A |
| 26 | 5 | — | — | 34 | 43 | 1.185 | 84 A/34 D |
| 27 | 5 | 1 | 10 | 11 | 36 | 1.145 | 82 A |
| 28 | 5 | 1 | 20 | 30 | 37 | 1.105 | 80 A |
| 29 | 5 | 2 | 10 | 8 | 34 | 1.15 | 83 A |
| 30 | 5 | 2 | 20 | 16 | 31 | 1.11 | 82 A |
| 31 | 6 | — | — | 38 | 48 | 1.235 | 91 A/42 D |
| 32 | 6 | 1 | 10 | 10 | 41 | 1.185 | 90 A |
| 33 | 6 | 2 | 10 | 7 | 45 | 1.185 | 91 A |
| 34 | 6 | 3 | 10 | 8 | 45 | 1.185 | 90 A |
| 35 | 7 | — | — | 36 | 50 | 1.195 | 82 A |
| 36 | 7 | 1 | 10 | 8 | 45 | 1.155 | 82 A |
| 37 | 7 | 2 | 10 | 14 | 32 | 1.155 | 83 A |

The Examples 19 to 22 marked with (c) are comparative examples which were carried out using comparatively hard TPU. The abrasion of these comparative blends shows no improvement compared to pure TPU. However, there is also no worsening of the tensile strength.

The blends of the present invention comprising soft TPUs and polyolefins display, compared to pure TPU, an unexpectedly significant reduction in the abrasion by up to 85% (see Examples 12 and 15). Despite the thus significantly improved, i.e. reduced, abrasion, the blends of the present invention show, only in a few cases, a slight and thus acceptable worsening of the tensile strength.

The object of the present invention was thus able to be achieved by the blend of the present invention.

We claim:

1. A thermoplastic polyurethane blend comprising:
   (a) thermoplastic polyurethane having a Shore hardness of from 60 A to 50 D and
   (b) unmodified ethylene-propylene (EPM) rubbers wherein said thermoplastic blend is exclusive of aromatic unsaturated monomers, and the weight ratio of (a):(b) is from 6:1 to 100:1.

2. The thermoplastic polyurethane blend of claim 1 wherein (b) further comprises ethylene-propylene (EPM) rubbers which have been grafted with compounds selected from the group consisting of acrylic acid, methacrylic acid, non-aromatic derivatives of acrylic acid and methacrylic acid, maleic anhydride, and mixtures thereof.

3. The thermoplastic polyurethane blend of claim 1 or 2 wherein said thermoplastic polyurethane has a Shore hardness of from 60 A to 54 D.

4. The thermoplastic polyurethane blend of claim 1 or 2 wherein said thermoplastic polyurethane has a Shore hardness of from 60 A to 42 D.

5. The thermoplastic polyurethane blend of claim 1 or 2 wherein said thermoplastic polyurethane has a Shore hardness of from 82 A to 42 D.

* * * * *